United States Patent
Rampp et al.

(10) Patent No.: US 9,856,942 B2
(45) Date of Patent: Jan. 2, 2018

(54) ARTICULATED CHAIN WITH LOW-FRICTION LINK PLATE BACK

(71) Applicant: iwis motorsysteme GmbH & Co. KG, München (DE)

(72) Inventors: Christoph Rampp, München (DE); Richard Koschig, Freising (DE); Jürgen Vogel, München (DE)

(73) Assignee: IWIS MOTORSYSTEME GMBH & CO. KG, München (DE)

( * ) Notice: Subject to any disclaimer, the term of this patent is extended or adjusted under 35 U.S.C. 154(b) by 0 days.

(21) Appl. No.: 15/009,585

(22) Filed: Jan. 28, 2016

(65) Prior Publication Data

US 2016/0223053 A1    Aug. 4, 2016

(30) Foreign Application Priority Data

Feb. 3, 2015   (DE) .................. 10 2015 001 334

(51) Int. Cl.
| | |
|---|---|
| *F16H 57/04* | (2010.01) |
| *F16G 13/04* | (2006.01) |
| *F16G 13/06* | (2006.01) |
| *F16H 7/08* | (2006.01) |

(52) U.S. Cl.
CPC ............ *F16G 13/06* (2013.01); *F16G 13/04* (2013.01); *F16H 7/08* (2013.01); *F16H 2007/0872* (2013.01)

(58) Field of Classification Search
CPC ...... F16H 2007/0872; F16H 7/18; F16H 7/08; F16G 13/04; F16G 13/06

USPC .................... 474/91, 212, 213, 214
See application file for complete search history.

(56) References Cited

U.S. PATENT DOCUMENTS

| | | | |
|---|---|---|---|
| 2,355,003 A * | 8/1944 | McCann ................ | B62J 31/00 |
| | | | 184/16 |
| 2,823,553 A * | 2/1958 | Harrington .......... | F16C 19/163 |
| | | | 16/36 |
| 4,509,937 A * | 4/1985 | Ledvina ................ | B21L 9/06 |
| | | | 474/213 |
| 4,547,182 A * | 10/1985 | Rattunde ................ | F16G 5/18 |
| | | | 474/213 |

(Continued)

FOREIGN PATENT DOCUMENTS

| | | |
|---|---|---|
| DE | 197 47 163 A1 | 4/1998 |
| DE | 198 20 039 A1 | 12/1998 |

(Continued)

*Primary Examiner* — Henry Y Liu
(74) *Attorney, Agent, or Firm* — Baker & Hostetler LLP

(57) ABSTRACT

An articulated chain comprises alternate inner and outer chain links interconnected by a chain joint. Each inner chain link comprises at least one chain link plate and each outer chain link comprises at least two chain link plates, and the chain link plates have a structured link plate back that is adapted to be brought into contact with a tensioning or guide rail. The structured link plate back comprises at least one recess having a closed circumference or at least one recess having a circumference that is closed with the exception of an access opening, and is straight or slightly concave in shape for contact with a tensioning or guide rail. A chain drive comprising a driving sprocket, at least one driven sprocket, and at least one tensioning or guide rail and an articulated chain, in contact with the at least one tensioning or guide rail is provided.

12 Claims, 4 Drawing Sheets

(56) References Cited

U.S. PATENT DOCUMENTS

| | | | | |
|---|---|---|---|---|
| 4,758,209 A * | 7/1988 | Ledvina | ........... | F16H 55/30 474/156 |
| 4,832,668 A * | 5/1989 | Ledvina | ........... | F16G 13/04 474/155 |
| 5,647,811 A * | 7/1997 | Mott | ........... | F16H 7/08 184/16 |
| 5,720,682 A * | 2/1998 | Tada | ........... | F01M 9/108 184/15.1 |
| 5,868,638 A * | 2/1999 | Inoue | ........... | F16H 7/0848 474/101 |
| 6,062,998 A * | 5/2000 | Kumakura | ........... | F16H 7/18 474/110 |
| 6,220,981 B1 * | 4/2001 | Yoshida | ........... | F16G 13/06 474/111 |
| 6,406,396 B1 * | 6/2002 | Turner | ........... | F16G 5/18 474/206 |
| 7,419,449 B2 * | 9/2008 | Tohara | ........... | F16G 13/02 474/212 |
| 7,546,725 B2 * | 6/2009 | Shimaya | ........... | B21L 9/02 29/90.7 |
| 7,585,239 B2 * | 9/2009 | Miyazawa | ........... | F16G 13/06 474/155 |
| 7,837,583 B2 * | 11/2010 | Tohara | ........... | F16G 13/08 474/201 |
| 7,942,769 B2 * | 5/2011 | Pflug | ........... | F16H 7/18 474/111 |
| 7,963,872 B2 * | 6/2011 | Tohara | ........... | F16G 13/04 474/157 |
| 8,088,029 B2 * | 1/2012 | Tohara | ........... | F16G 13/06 474/111 |
| 8,192,313 B2 * | 6/2012 | Ispolatova | ........... | B21L 11/00 474/229 |
| 8,323,136 B2 * | 12/2012 | Heinrich | ........... | F16H 7/08 474/110 |
| 8,696,500 B2 * | 4/2014 | Hirayama | ........... | F16H 7/18 184/11.5 |
| 8,708,850 B2 * | 4/2014 | Tohara | ........... | F16G 13/02 474/206 |
| 8,747,263 B2 * | 6/2014 | Konno | ........... | F16H 7/18 474/111 |
| 8,900,079 B2 * | 12/2014 | Mori | ........... | F16H 7/18 474/111 |
| 9,109,657 B2 * | 8/2015 | Bodensteiner | ........... | F16G 13/02 |
| 9,255,624 B2 * | 2/2016 | Fukumori | ........... | F16G 13/06 |
| 9,303,725 B2 * | 4/2016 | Fukumori | ........... | B62M 9/00 |
| 9,534,516 B2 * | 1/2017 | Utaki | ........... | F01M 9/10 |
| 9,534,661 B2 * | 1/2017 | Belmer | ........... | F16G 13/06 |
| 2002/0026782 A1 * | 3/2002 | Nakagawa | ........... | B21C 37/06 59/4 |
| 2003/0109342 A1 * | 6/2003 | Oliver | ........... | F16H 7/1281 474/134 |
| 2004/0043854 A1 * | 3/2004 | Fraley, Jr. | ........... | B62D 5/0424 474/134 |
| 2006/0175137 A1 * | 8/2006 | Alves | ........... | B66B 7/062 187/254 |
| 2006/0293134 A1 * | 12/2006 | Markley | ........... | F16H 7/08 474/111 |
| 2007/0032325 A1 * | 2/2007 | Shimaya | ........... | B21L 9/02 474/213 |
| 2008/0020882 A1 * | 1/2008 | Tohara | ........... | F16G 13/02 474/212 |
| 2008/0300079 A1 * | 12/2008 | Botez | ........... | F16G 13/04 474/213 |
| 2009/0036241 A1 * | 2/2009 | Hirayama | ........... | F16H 7/18 474/111 |
| 2009/0042683 A1 * | 2/2009 | Tohara | ........... | F16G 13/08 474/213 |
| 2009/0239692 A1 * | 9/2009 | Heinrich | ........... | F16H 7/08 474/111 |
| 2009/0325748 A1 * | 12/2009 | Pflug | ........... | F16H 7/18 474/91 |
| 2011/0183800 A1 * | 7/2011 | Tohara | ........... | F16G 13/18 474/206 |
| 2011/0244999 A1 * | 10/2011 | Nakamura | ........... | F16H 9/18 474/91 |
| 2012/0129636 A1 * | 5/2012 | Lee | ........... | F16H 7/18 474/111 |
| 2013/0090201 A1 * | 4/2013 | Mori | ........... | F16H 7/18 474/140 |
| 2013/0109517 A1 * | 5/2013 | Tiernan | ........... | F16H 57/05 474/91 |
| 2015/0204218 A1 * | 7/2015 | Utaki | ........... | F01M 9/10 474/140 |
| 2015/0204437 A1 * | 7/2015 | Utaki | ........... | F16H 7/18 474/91 |

FOREIGN PATENT DOCUMENTS

| | | |
|---|---|---|
| DE | 199 07 865 A1 | 9/1999 |
| DE | 101 19 698 A1 | 10/2001 |
| DE | 10 2011 009 298 A1 | 7/2011 |
| DE | 10 2012 206 565 A1 | 10/2013 |
| EP | 1 881 230 A2 | 1/2008 |

* cited by examiner

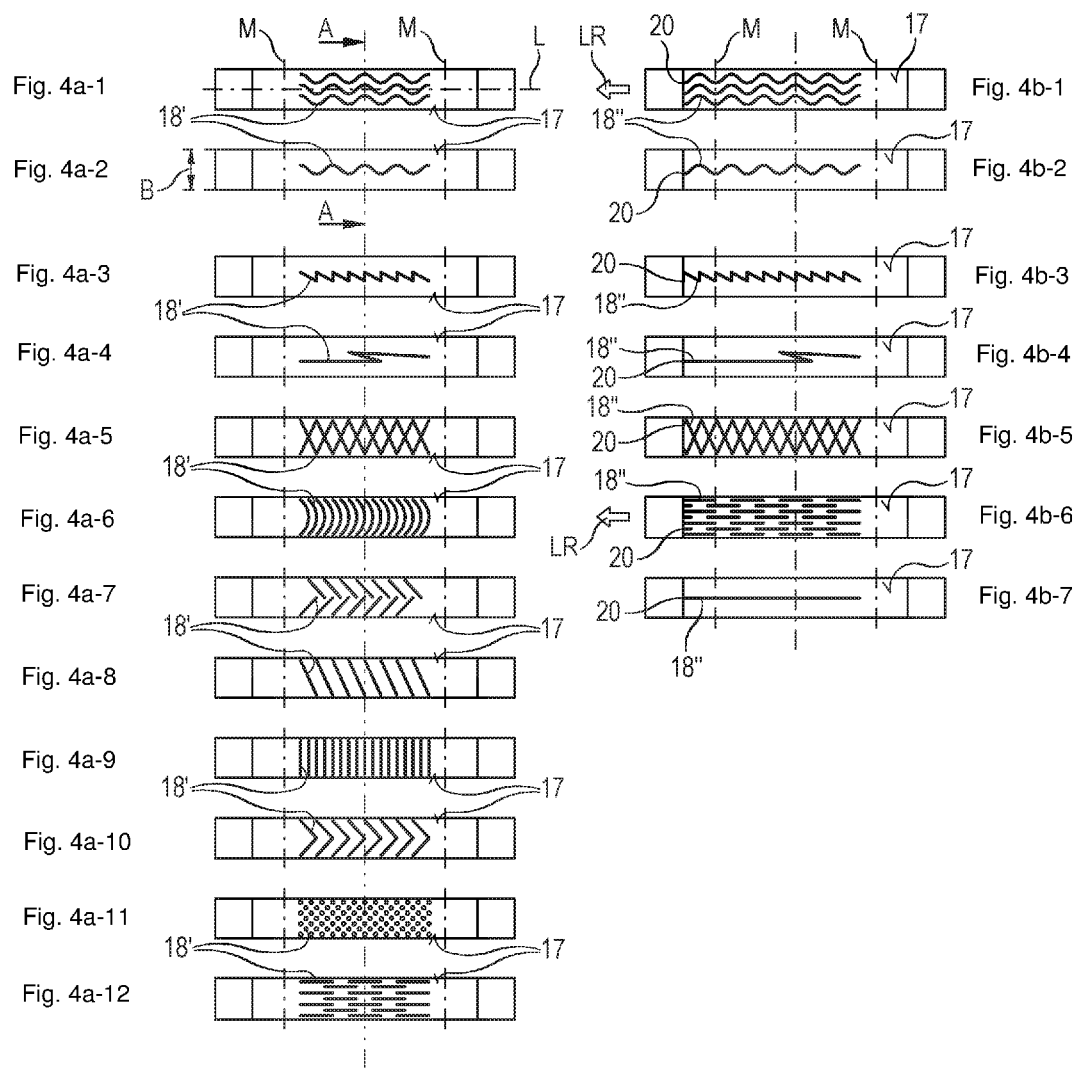

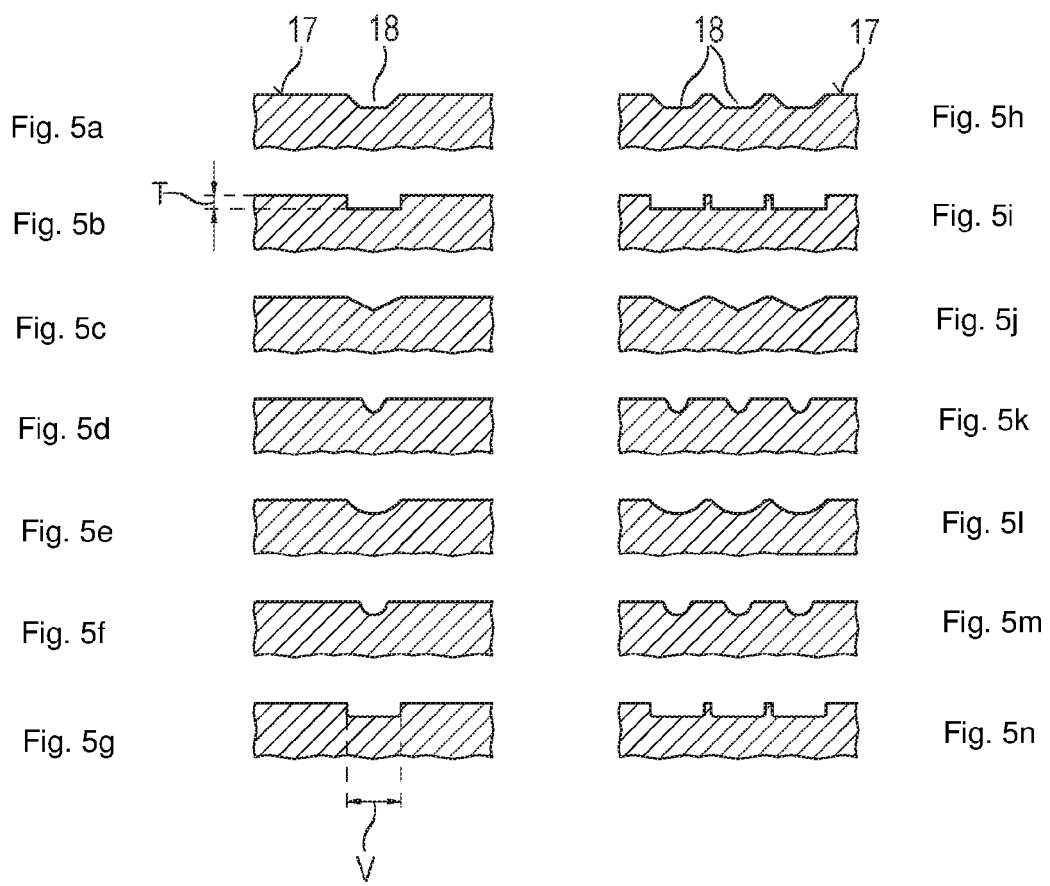

ARTICULATED CHAIN WITH LOW-FRICTION LINK PLATE BACK

CROSS-REFERENCE TO RELATED APPLICATION

This application claims priority to foreign German patent application No. 102015001334.3, filed on Feb. 3, 2015, the disclosure of which is incorporated by reference in its entirety.

FIELD OF THE INVENTION

The present invention relates to an articulated chain comprising alternate inner chain links and outer chain links interconnected by means of a respective chain joint, each inner chain link comprising at least one chain link plate and each outer chain link comprising at least two chain link plates, and the chain link plates of the inner and/or outer chain links having a structured link plate back that is adapted to be brought into contact with a tensioning or guide rail.

BACKGROUND

This kind of articulated chain is known e.g. from DE 199 07 865 A1, where the chain link plates used have a link plate back comprising two spaced-apart contact portions between which a lubricant holding space is defined. The area of contact with the tensioning and/or guide rail of a chain drive is thus reduced to the contact portions, a lubricant reservoir being defined between the contact portions due to the recessed shape of the link plate back. Such chains are frequently used as timing chains of an internal combustion engine for connecting the crankshaft of the engine with at least one camshaft. In such a timing chain drive a guide rail is arranged in the tight span and a tensioning rail, which is adapted to be pressed on by means of a chain tensioner, is arranged in the slack span, the special shape of the link plate back being intended to reduce the friction between the rails and the chain.

A similar articulated chain is known from U.S. Pat. No. 7,963,872 B2. Also in this articulated chain the link plate backs comprise spaced-apart contact portions having provided between them a contour that fills with lubricant.

DE 10 2012 206 565 A1 discloses a toothed chain in which the link plate backs of the toothed plates have a cross-channel-like structure to which part of a lubricant or oil film adheres when the toothed chain circulates in the chain drive, so as to reduce the friction in the chain drive.

The progressive technical development in the automotive sector also leads to an increase in the demands and in the pressure to innovate for components such as articulated chains, which are used in internal combustion engines as driving or timing chains. In addition to the constant need for improving components within the framework of the development of new engines, there is, with due regard to the cost pressure that normally prevails in the automotive industry in connection with high piece numbers, a general necessity to innovate and, for articulated chains in particular, a demand to provide cost-efficient solution concepts entailing little wear problems and low friction and providing thus a potential for saving $CO_2$.

SUMMARY OF THE INVENTION

It is therefore the object of the present invention to provide an articulated chain of the type referred to at the beginning, which allows an improved friction behavior between the articulated chain and a tensioning or guide rail.

In the case of an articulated chain of the generic kind, the present invention achieves the above object in that the structured link plate back comprises at least one recess having a closed circumference or at least one recess having a circumference that is closed with the exception of an access opening, the structured link plate back being straight or slightly concave in shape for contact with a tensioning or guide rail. The pocket-shaped recesses on the structured link plate backs, which are arranged in spaced relationship with the edges of the link plate backs and are thus fully, or with the exception of an access opening, enclosed by the surface of the link plate back on the circumference of the recess, allow the formation of a lubricating pad in the area of the closed or semi-open recess and thus the formation of a pressure pad between the structured link plate backs and the tensioning or guide rail. The recesses having a closed or semi-open circumference on the structured link plate backs prevent, when the chain link plates come into contact with the tensioning or guide rail, the lubricant from being laterally pressed out of and discharged from the recesses on the link plate back due to such contact with the tensioning or guide rail. Also in the case of the recesses having a circumference that is closed with the exception of an access opening, which will also be referred to as semi-open recesses hereinafter, the closed portion of the recesses prevents the lubricant, which can flow unhindered into the recess via the access opening, from being laterally pressed out and discharged. Since the movement of the articulated chain causes a constant flow of lubricant into the closed-circumference recesses or the semi-open recesses, a lubricating pad forms at the closed portions between the rail and the link plate backs. Depending on the orientation of the semi-open recesses, the access opening is oriented relative to the closed portion of the semi-open recess in the running direction of the articulated chain such that the lubricant is allowed to flow in and lateral pressing out and discharge of the lubricant is reliably prevented.

Due to the lubricating pads forming in the closed-circumference recesses or the semi-open recesses and due to the resultant pressure pads between the rail and the link plate back, the chain link plate is allowed to slide on the tensioning or guide rail without direct rail contact or with a significantly reduced rail contact. The result is a hydrodynamic sliding contact or a sliding friction comprising a high hydrodynamic component, with a coefficient of friction that is substantially reduced due to the low-loss liquid friction. In addition to the reduction of friction caused by the lubricant on the articulated chain, also the wear occurring at the tensioning or guide rails will be reduced by the structured link plate backs of an articulated chain according to the present invention, since the two friction partners in the hydrodynamic component of the sliding contact are separated from one another by one or a plurality of lubricating pads.

In order to allow the effect produced by the lubricant pockets formed in the structured link plate backs to be realized in the best possible way when the latter come into contact with the tensioning or guide rail, the structured link plate backs, which extend substantially on the contour of the chain link plates between the center lines of the joint openings, are straight in shape, i.e. parallel to the longitudinal axis of the chain link plate, or slightly concave, so as to accomplish the highest possible coverage area between the link plate backs and tensioning or guide rails when said link plate backs come into contact with said tensioning or guide rails that are normally convex in shape. This improves the formation of the lubricating pads at the lubricant pockets of the link plate backs. Moreover, the lubricant will adhere to the closed or semi-open recesses of the structured link plate backs also beyond the tensioning or guide rail, thus reducing the friction and the wear of the additional components while the articulated chain is running through the chain drive.

According to a special embodiment, the recess having a fully closed circumference or the recess having a circumference that is closed with the exception of an access opening is elongate in shape, and at least one portion of the elongate recess is arranged at an angle between 5° and 90° relative to the longitudinal axis of the chain link plate, preferably at an angle between 20° and 80° relative to the longitudinal axis of the chain link plate. The elongate shape of the lubricant pockets formed by the closed-circumference recesses and their inclination relative to the longitudinal axis of the chain link plate allows the lubricant to be easily introduced in the recess, in particular via the access opening of the semi-open recess, and to be efficiently distributed also transversely to the longitudinal axis of the chain link plate, i.e. transversely to the running direction of the articulated chain along the tensioning or guide rail. This will improve not only the creation of the lubricating pads but also the formation of the pressure pad between the tensioning or guide rail and the link plate back across the width of the chain link plate. A limited angular range between 20° and 80° relative to the longitudinal axis can here improve the effect of thicker lubricating pads through the elongate, inclined lubricant pockets as well as the flow of the lubricant thereinto via the access opening. The access opening of the recesses having a semi-open circumference is oriented in the running direction of the articulated chain relative to the elongate portion of the recess so as to prevent an unintentional discharge of the lubricant.

According to a further embodiment, the width of the closed-circumference recess or of the recess having a circumference that is closed with the exception of an access opening is between 0.1% and 20% of the width of the chain link plate, preferably between 1% and 5% of the width of the chain link plate. The microstructuring of the circumferentially closed or semi-open recesses on the structured link plate backs allows a provision of lubricant pockets without affecting the strength of the chain link plates and thus of the articulated chain in its entirety. The microstructured surface is also effective below the hydrodynamic lubrication range in the mixed friction range, i.e. when the surfaces are completely separated by the lubricating pads created in the lubricant pockets.

According to a preferred embodiment, the depth of the closed-circumference recess or of the recess having a circumference that is closed with the exception of an access opening may be between 5% and 70% of the width of the recess, preferably between 5% and 50% of the width of the recess. The optimally selected, comparatively small depth of the lubricant pockets results in the formation of a fairly large lubricating pad so as to allow low-loss liquid friction, i.e. a hydrodynamic sliding component between the link plate back and the tensioning or guide rail. In addition, flat lubricant pockets also facilitate a subsequent formation of lubricant pockets in the link plate backs of the chain link plates.

In order to accommodate the largest possible volume of lubricant in a closed-circumference or semi-open recess, the cross-sectional profile of the closed-circumference recess or of the recess having a circumference that is closed with the exception of an access opening may be rectangular. Alternatively, the cross-sectional profile of the closed-circumference recess or of the semi-open recess may be trapezoidal. The lubricant volume that can here be introduced into the lubricant pocket is still comparatively large, but the cross-sectional profile is less difficult to manufacture.

According to another embodiment, the cross-sectional profile of the closed-circumference recess or of the semi-open linear recess is triangular. A triangular cross-sectional profile can easily be manufactured by various methods and can especially also be used for a subsequent formation of lubricant pockets in structured link plate backs. Furthermore, the cross-sectional profile of the closed-circumference recess or of the semi-open linear recess may also be concave in shape. In addition to a comparatively larger volume of the lubricant pocket, a concave cross-sectional profile also allows a high pressure build-up in the lubricant and, consequently, the formation of the lubricating pad.

According to an advantageous embodiment, the structured link plate back comprises at least three closed-circumference recesses or at least three recesses having a circumference closed with the exception of an access opening, the at least three or more recesses being uniformly spaced from one another. By making use of a plurality of lubricant pockets that are displaced relative to one another on the link plate back, the hydrodynamic component between the structured link plate backs of the chain link plates and a tensioning or guide rail can be increased, whereby friction losses will be reduced. For accomplishing a hydrodynamic sliding component that is as high and as uniform as possible, it will be useful to arrange the lubricant pockets at equal distances from one another.

The present invention additionally relates to a chain drive, e.g. a timing chain drive of an internal combustion engine, comprising a driving sprocket and at least one driven sprocket, an articulated chain according to the present invention wrapped around these sprockets, and at least one tensioning and/or guide rail which is in contact with the articulated chain. Such a timing chain drive can also be used in internal combustion engines having a low oil pressure or a poor lubricant supply.

BRIEF DESCRIPTION OF THE DRAWINGS

In the following, embodiments of the present invention will be explained in more detail making reference to the drawings, in which:

FIGS. 4a-1 to 4a-12 show top views of various embodiments of the structured link plate backs of chain link plates of an articulated chain according to the present invention with recesses having a closed circumference, FIGS. 4b-1 to 4b-7 show top views of various embodiments of the structured link plate backs of chain link plates of an articulated chain according to the present invention with recesses having a circumference that is closed with the exception of an access opening, and FIGS. 5a-5n show cross-sectional views through a part of the structured link plate backs of chain link plates of articulated chains according to the present invention of the type shown in FIGS. 4a-1 to 4a-12.

DETAILED DESCRIPTION

Figure 1:
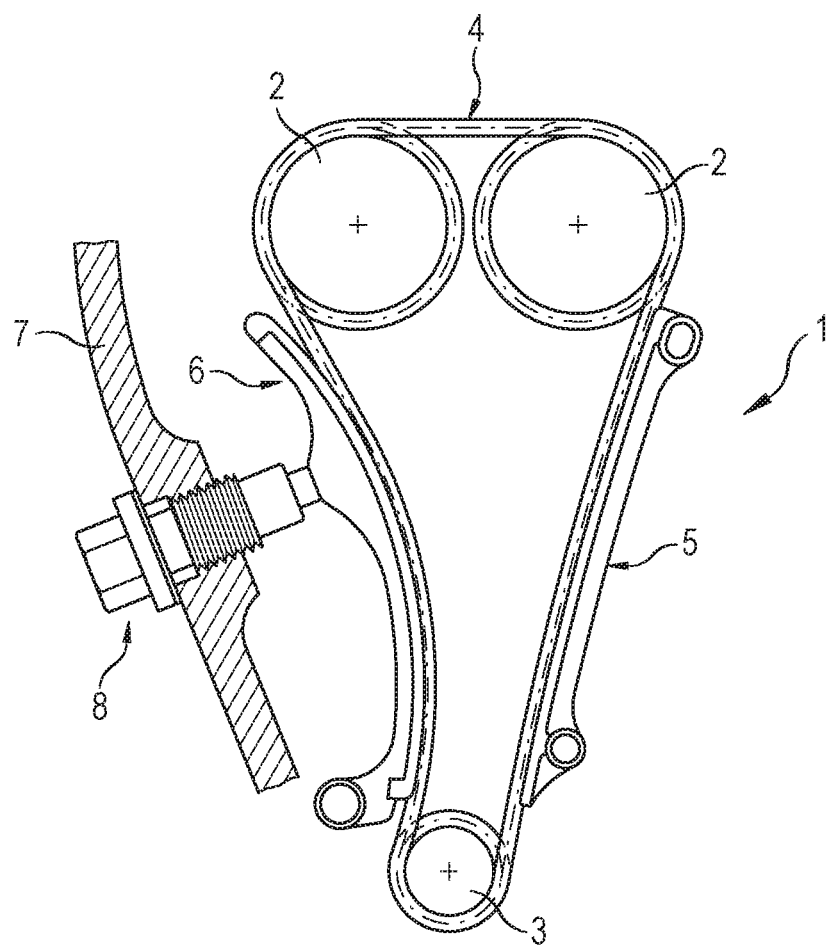
FIG. 1 shows a timing chain drive according to the present invention.

FIG. 1 shows a timing chain drive for an internal combustion engine. The chain drive 1 comprises two upper camshaft sprockets 2, a lower crankshaft sprocket 3, an endless articulated chain 4 wrapped therearound, a guide rail 5 and a pivotably arranged tensioning rail 6, which is pressed on by means of a chain tensioner 8 screwed in position in the crankcase 7. The chain tensioner 8 is preferably connected to engine oil hydraulic system so that its tensioning piston is hydraulically pressed onto the pivotably arranged tensioning rail 6, thus providing a pretension to the articulated chain 4. Both the guide rail 5 and the tensioning rail 6 contact with their sliding linings 16 the back of the articulated chain 4 running therealong. The movement of the articulated chain 4 along the guide rail 5 and the tensioning rail 6 causes friction losses that are reduced due to the structural design according to the present invention of the embodiments of the articulated chain 4 described hereinbelow.

Figure 2A:
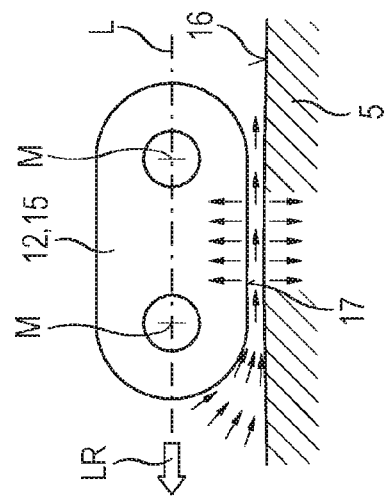
FIG. 2a shows a side view of an articulated chain according to the present invention with straight chain link plates.
Figure 2B:
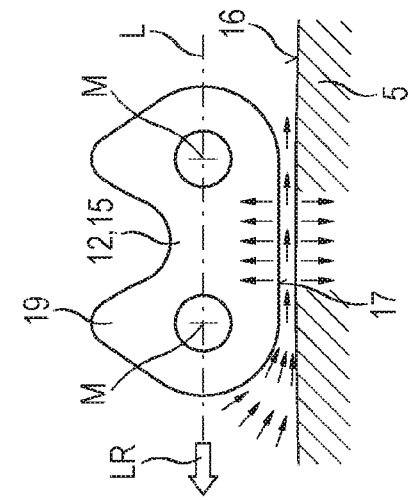
FIG. 2b shows a chain link plate of the articulated chain according to FIG. 2a in a hydrodynamic sliding condition.

The first embodiment of an articulated chain 4 according to the present invention described with reference to FIGS. 2a and 2b comprises alternate outer chain links 10 and inner chain links 11 interconnected by a chain joint 9. Each outer chain link 10 consists of two spaced-apart outer chain link plates 12 and of two joint pins 13 interconnecting these outer chain link plates 12. These joint pins 13 are cylindrical in shape for simple chain joints 9 or they may be configured as rocker pins for alternative rocker pin joints. For forming a simple chain joint 9, the joint pins 13 are press-fitted into associated pin openings 14 in the outer chain link plates 12 such that they slightly project therebeyond. Each inner chain link 11 consists of at least one chain link plate 15 or of two chain link plates 15 arranged in parallel, spaced-apart relationship with one another and interconnected by two spaced-apart joint bushings. On the back of the articulated chain 4, the structured link plate backs 17 of the outer chain link plates 12 and/or the at least one inner chain link plate 15 are in contact with the sliding lining 16 of the guide rail 5 along which the articulated chain 4 slides during operation. The guide rail 5 is slightly convex so as to guarantee a uniform contact with the articulated chain 4 and prevent the articulated chain 4 from rattling during operation. Accordingly, the contour of the chain link plates 12, 15 on the back of the articulated chain 4 along the structured link plate back 17 is slightly concave, or at least straight, in shape.

During operation of a conventional articulated chain 4 in an internal combustion engine, the engine oil supplied to the chain drive 1 and present on the articulated chain 4 as well as on the guide rail 5 and the tensioning rail 6, respectively, reduces the contact friction between the chain link plates 12, 15 and the sliding lining 16 of the guide rail 5 and of the tensioning rail 6. In the case of an articulated chain 4 according to the present invention, in which the chain link plates 12, 15 are laterally provided with a structured link plate back 17 for contact with the guide rail 5 or the tensioning rail 6, the engine oil used as a lubricant collects in the recesses 18', 18" which have a closed circumference or a semi-open circumference and from which the engine oil cannot escape to the side, since such lubricant pockets 18 end in spaced relationship with the edges of the link plate back 17 and are delimited by the surface of the link plate backs 17. Since the lubricant cannot escape from these lubricant pockets 18 to the side, a lubricating pad forms due to the movement of the articulated chain 4 in the running direction LR along the sliding lining 16 of the guide rail 5 and due to the flow of lubricant into the lubricant pockets 18, said lubricating pad projecting beyond the surface of the link plate backs 17 and forming a pressure pad between the structured link plate backs 17 and the sliding lining 16. The pressure pad, represented in FIG. 2b by arrows that are perpendicular to the longitudinal axis L of the link plate 12, 15, has the effect that the frictional contact between the chain link plates 12, 15 and the sliding lining 16 of the guide rail 5 is converted, at least in certain areas, into a condition of a hydrodynamic sliding contact providing a substantially reduced coefficient of friction due to the small friction losses of liquid friction.

Figure 3A:
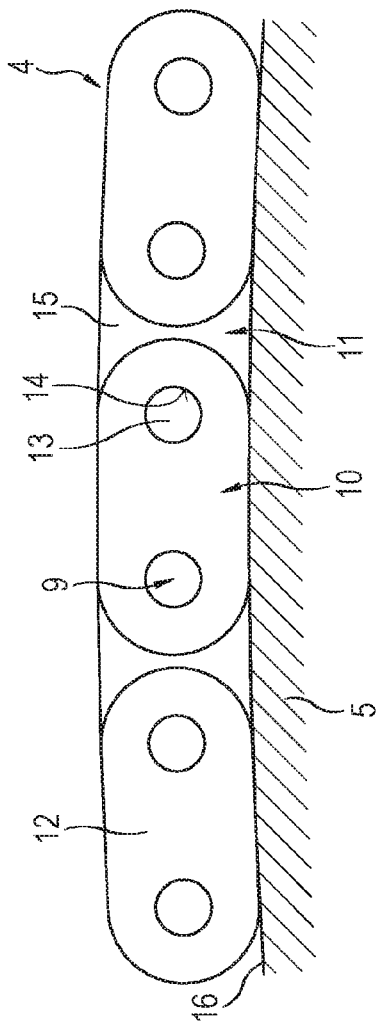
FIG. 3a shows a side view of an articulated chain according to the present invention with toothed chain link plates.

A further embodiment of an articulated chain 4 according to the present invention is shown in FIG. 3a. Also this articulated chain 4 comprises alternate outer chain links 10 and inner chain links 11 interconnected by a respective chain joint 9. The outer chain links 10 of this articulated chain 4, which is configured as a toothed chain, comprise two spaced-apart outer chain link plates 12 having two teeth 19 on the front side that is not in contact with the guide rail 5. Each inner chain link 11 of this articulated chain 4, which is configured as a toothed chain, comprises at least one inner chain link plate 15 having also two teeth 19. The joint pins 13 of the chain joints 9 extend through associated pin openings 14 in the outer chain link plates 12 through the inner chain link plates 15 of the inner chain link 11. This articulated chain 4 configured as a toothed chain contacts the sliding lining 16 of the guide rail 5 with the back of the chain link plates 12, 15.

Figure 3B:
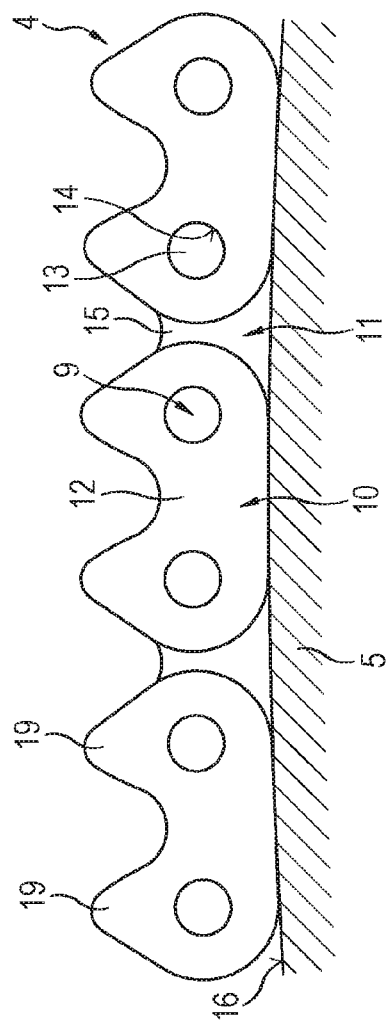
FIG. 3b shows a toothed chain link plate of the articulated chain according to FIG. 3a in a hydrodynamic sliding condition.

FIG. 3b shows again the effect of the recesses 18', 18", which have a closed circumference or a circumference that is closed with the exception of an access opening, at the structured link plate back 17 during operation of the articulated chain 4 configured as a toothed chain. The engine oil supplied in the timing chain drive 1 during operation as well as the engine oil adhering to the articulated chain 4, which is configured as a toothed chain, and to the guide and tensioning rails 5, 6 collects in the lubricant pockets 18 formed by the closed or semi-open recesses 18', 18", when the structured link plate backs 17 of the chain link plates 12, 15 move along the sliding lining 16 of the guide rail 5 in the running direction LR of the articulated chain 4. The continuous supply of engine oil to the lubricant pockets 18 causes a formation of lubricating pads in the lubricant pockets 18 and leads thus to the provision of a pressure pad between the structured link plate backs 17 and the sliding lining 16, said pressure pad converting the sliding contact between the chain link plates 12, 15 and the guide rail 5 or the tensioning rail 6 into a hydrodynamic sliding contact. The higher the hydrodynamic sliding contact component of the entire contact between the articulated chain 4 and the guide or tensioning rail 5, 6 in comparison with a frictional contact between the structured link plate backs 17 and the sliding lining 16 is, the lower the total friction losses will be, since in a hydrodynamic sliding contact the friction partners are separated from one another by the lubricating pads.

FIGS. 4a-1 to 4a-12 show various embodiments of the structured link plate backs 17 of articulated chains 4 according to the present invention. The structured link plate back 17 of the chain link plates 12, 15 extends on the back of the chain link plates 12, 15 at least along a portion of the link plate contour between the perpendiculars to the center lines M of the joint pins 13. Whereas in the case of articulated chains 4 configured as toothed chains only the back of the chain link plates 12, 15 may be formed with a structured link plate back 17, straight chain link plates 12, 15 may be provided with structured link plate backs 17 on the back as well as on the front of the chain link plates 12, 15. The closed circumference recesses 18' provided in the structured link plate backs 17 may be formed on the surface of the link plate backs 17 in very different shapes, numbers and orientations.

The first four representations, FIGS. 4a-1 to 4a-4, show fairly elongate structures extending over most of the total length of the structured link plate back 17. The closed recesses 18' extend here in a wave-shaped, saw tooth-shaped or lightning-shaped fashion over the structured link plate back 17 and one or a plurality of parallel recesses 18' may be provided across the width B of the chain link plates 12, 15. The subsequent six representations show shorter closed-circumference recesses 18' extending substantially transversely to the longitudinal axis L of the chain link plate 12, 15, a plurality of recesses 18' being arranged parallel to one another along the longitudinal axis L of the structured link plate backs 17. In addition to a grid- or diamond-shaped structure, in the case of which a plurality of closed-circumference recesses 18' jointly define a lubricant pocket 18, the closed recesses 18' may be configured in an imbricate fashion or in a herringbone pattern, they may be strongly inclined, perpendicular or arrow-shaped, and arranged in parallel along the structured link plate backs 17. In addition, FIGS. 4a-1 to 4a-12 also show embodiments of structured link plate backs 17 in the case of which the closed circumference recesses 18' are configured as round or elongate cup-shaped lubricant pockets 18, which, by forming a very large number of small lubricating pads over a uniformly distributed area, try to accomplish the highest possible hydrodynamic sliding component. Furthermore, the last representation also shows a structured link plate back 17 having a plurality of closed recesses 18', which are displaced relative to one another and oriented in the direction of the longitudinal axis L and which produce a thicker pressure pad at the respective end of the lubricant pockets 18, when the chain link plates 12, 15 move along the sliding lining 16.

FIGS. 4b-1 to 4b-7 show additional embodiments of the structured link plate backs 17 of articulated chains 4 according to the present invention, in the case of which the structured link plate back 17 of the chain link plates 12, 15 extends on the back of the chain link plates 12, 15 along the link plate structure on one side thereof in the running direction LR of the articulated chain 4 to a point beyond the perpendicular to the center lines M of the joint pins 13 and into the curved end face area of the chain link plates 12, 15. In the area of the curved end faces of the chain link plates 12, 15, the recesses 18" having a semi-open circumference are provided with an access opening 20 allowing a permanent supply of engine oil into the lubricant pockets 18 in the running direction LR of the articulated chain 4. The unhindered supply of engine oil into the lubricant pockets 18 through the access opening 20 of the semi-open recess 18" leads, in spite of the access opening 20, to the formation of a sufficient lubricating pad in the lubricant pocket portion having a closed circumference in a direction opposite to the running direction LR, and thus to the formation of a pressure pad for the hydrodynamic sliding contact between the structured link plate back 17 and the guide rail 5 or the tensioning rail 6. The semi-open recesses 18" are here rather configured as elongate structures extending over most of the entire length of the structured link plate back 17 and being in particular elongate, wave-shaped, sawtooth-shaped, lightning-shaped, grid- or diamond shaped. The semi-open recesses 18" ending in the area of the curved end face when seen in the running direction LR have formed therein an access opening 20, said access opening 20 resulting especially from the fact that the semi-open recess 18" ends in the area of the curved end faces.

As can be seen in FIGS. 5a-5n, the cross-sectional profile of the lubricant pockets 18 having a closed or a semi-open circumference may be configured in a great variety of different ways. When seen in a cross-sectional view, the lubricant pockets 18 may have formed therein a trapezoidal recess, a rectangular recess, a triangular recess, a concave recess, a segment-shaped recess, a semicircular recess or a rounded rectangular recess. Furthermore, in addition to individual recesses having a depth T relative to the surface of the link plate backs 17 and a width V, also a plurality of recesses having the depth T and the width V may be arranged parallel to one another on the structured link plate back 17, as shown in FIGS. 5h to 5n.

LIST OF REFERENCE NUMERALS 1 chain drive
2 camshaft sprockets
3 crankshaft sprocket
4 articulated chain
5 guide rail
6 tensioning rail
7 crankcase
8 chain tensioner
9 chain joint
10 outer chain links
11 inner chain links
12 outer chain link plates
13 joint pins
14 pin openings
15 inner chain link plates
16 sliding lining
17 link plate back
18 lubricant pockets
18' closed recesses
18" semi-open recesses
19 teeth
20 access opening
B width of the chain link plate
L longitudinal axis of the chain link plate
LR running direction of the articulated chain
M center line of the chain link plate
T depth of the lubricant pockets
V width of the lubricant pockets

The invention claimed is:

1. An articulated chain comprising alternate inner and outer chain links interconnected by means of a respective chain joint, wherein each inner chain link comprises at least one chain link plate and each outer chain link comprises at least two chain link plates, wherein the chain link plates of at least one of the inner and outer chain links have a structured link plate back that is adapted to be brought into contact with a tensioning or guide rail, and wherein the structured link plate back comprises at least one recess having a closed circumference or at least one recess having a circumference that is closed with the exception of one access opening, the structured link plate back being straight or concave in shape for contact with a tensioning or guide rail, and wherein the close-circumference recess or the recess having a circumference that is closed with the exception of one access opening is elongate in shape, and that at least one portion of the elongate recess is arranged at an angle between 5° and 90° relative to the longitudinal axis of the chain link plate.

2. The articulated chain according to claim 1, wherein the at least one portion of the elongate recess is arranged at an angle between 20° and 80° relative to the longitudinal axis of the chain link plate.

3. The articulated chain according to claim 1, wherein the width of the closed-circumference recess or of the recess having a circumference that is closed with the exception of an access opening is between 0.1% and 20% of the width of the chain link plate.

4. The articulated chain according to claim 3, wherein the width of the closed-circumference recess or of the recess having a circumference that is closed with the exception of an access opening is between 1% and 5% of the width of the chain link plate.

5. The articulated chain according to claim 1, wherein the depth of the closed-circumference recess or of the recess having a circumference that is closed with the exception of an access opening is between 5% and 70% of the width of the recess.

6. The articulated chain according to claim 5, wherein the depth of the closed-circumference recess or of the recess having a circumference that is closed with the exception of an access opening is between 5% and 50% of the width of the recess.

7. The articulated chain according to claim 1, wherein the cross-sectional profile of the closed-circumference recess or of the recess having a circumference that is closed with the exception of an access opening is rectangular.

8. The articulated chain according to claim 1, wherein the cross-sectional profile of the closed-circumference recess or of the recess having a circumference that is closed with the exception of an access opening is trapezoidal.

9. The articulated chain according to claim 1, wherein the cross-sectional profile of the closed-circumference recess or of the recess having a circumference that is closed with the exception of an access opening is triangular.

10. The articulated chain according to claim 1, wherein the cross-sectional profile of the closed-circumference recess or of the recess having a circumference that is closed with the exception of an access opening is concave.

11. The articulated chain according to claim 1, wherein the structured link plate back comprises at least three closed-circumference recesses or at least three recesses having a circumference that is closed with the exception of an access opening, the at least three recesses being uniformly spaced from one another.

12. A chain drive of an internal combustion engine, comprising a driving sprocket and at least one driven sprocket, an articulated chain according to claim 1 wrapped around these sprockets, and at least one tensioning or guide rail which is in contact with the articulated chain.

\* \* \* \* \*